(12) United States Patent
Hunt et al.

(10) Patent No.: US 6,954,570 B2
(45) Date of Patent: Oct. 11, 2005

(54) OPTICAL WAVEGUIDES AND INTEGRATED OPTICAL SUBSYSTEMS ON-A-CHIP

(75) Inventors: Andrew Tye Hunt, Atlanta, GA (US); Robert E. Schwerzel, Alpharetta, GA (US); Todd Polley, Atlanta, GA (US)

(73) Assignee: nGimat Co., Atlanta, GA (US)

( * ) Notice: Subject to any disclaimer, the term of this patent is extended or adjusted under 35 U.S.C. 154(b) by 297 days.

(21) Appl. No.: 10/398,641

(22) PCT Filed: Sep. 27, 2001

(86) PCT No.: PCT/US01/30282

§ 371 (c)(1),
(2), (4) Date: Apr. 4, 2003

(87) PCT Pub. No.: WO02/31557

PCT Pub. Date: Apr. 18, 2002

(65) Prior Publication Data

US 2004/0052461 A1 Mar. 18, 2004

Related U.S. Application Data

(60) Provisional application No. 60/239,074, filed on Oct. 6, 2000, and provisional application No. 60/302,569, filed on Jul. 2, 2001.

(51) Int. Cl.[7] .................. G02B 6/30; G02B 6/122; C03B 8/00
(52) U.S. Cl. .............. 385/49; 385/40; 385/50; 385/43; 65/386
(58) Field of Search .................. 385/2, 8, 40, 16, 385/43, 28, 49, 50; 65/386

(56) References Cited

U.S. PATENT DOCUMENTS

| | | | | |
|---|---|---|---|---|
| 4,666,236 A | * | 5/1987 | Mikami et al. | 385/51 |
| 5,140,651 A | * | 8/1992 | Soref et al. | 385/2 |
| 5,581,642 A | * | 12/1996 | Deacon et al. | 385/15 |

* cited by examiner

Primary Examiner—Akm Enayet Ullah
Assistant Examiner—Jerry T Rahil
(74) Attorney, Agent, or Firm—Alfred H. Muratori; Wayne E. Nacker

(57) ABSTRACT

Optical waveguide composite materials and integrated optical subsystems with low loss connection to optical fibers, are disclosed. The waveguide material has a varying thickness and/or refractive index from one portion (816) to another (820) and can be varied in all three directions. Methods of producing the composite materials and waveguides are also disclosed.

36 Claims, 11 Drawing Sheets

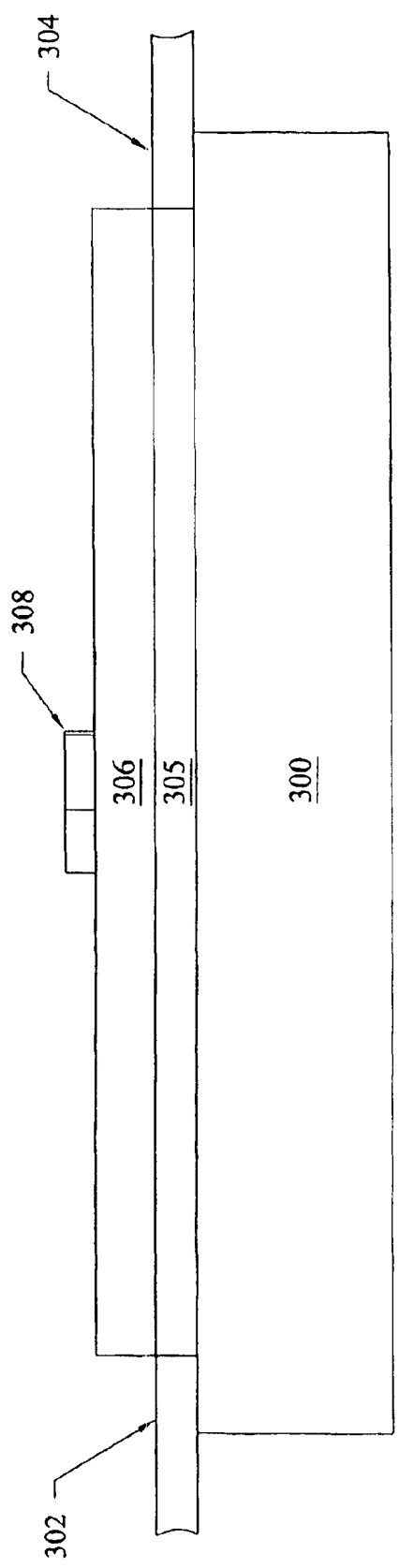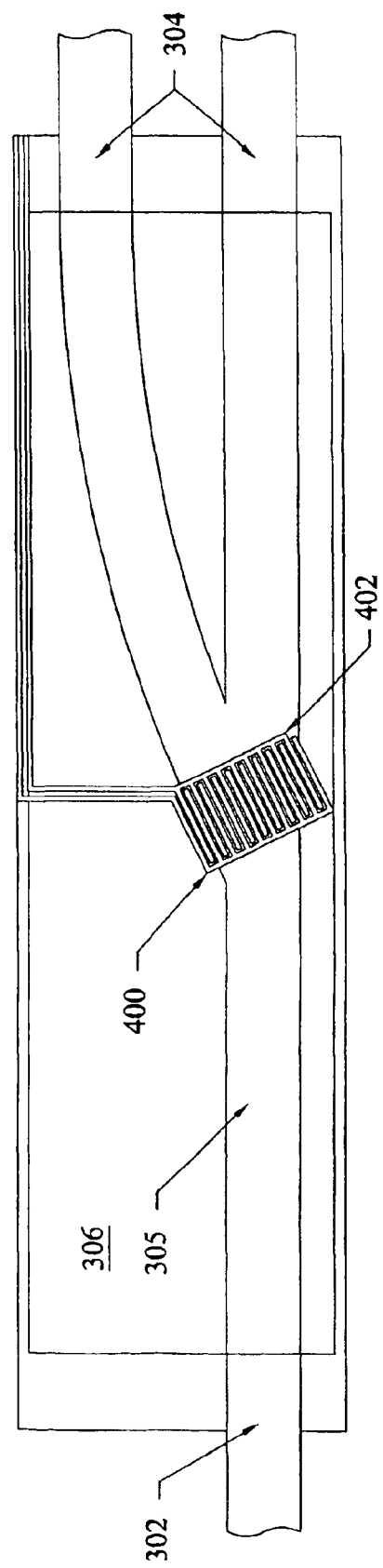

OPTICAL WAVEGUIDES AND INTEGRATED OPTICAL SUBSYSTEMS ON-A-CHIP

This application is a 371 of PCT/US01/30282 Sep. 27, 2001 which claims benefit of provisional 60/239,074 Oct. 6, 2000 and claims benefit of provisional 60/302,569 Jul. 2, 2001.

FIELD OF THE INVENTION

The present invention is directed to optical waveguides. In particular, the invention is directed to optical waveguides with enhanced coupling to external fiber-optic networks and to various, integral active and passive optical elements on the same substrate, and having compact configurations.

BACKGROUND OF THE INVENTION

Numerous types of optical waveguides for coupling optical fiber and other optical devices are known. These waveguides may have multiple inputs and outputs or may simply join two similar lengths of optical fiber. In addition, the waveguides may be active (thermooptic or electrooptic) or passive devices. Three important parameters of any optical waveguide are the loss through the device, the refractive index, and the size. Different types (multi-mode, single-mode) and different sizes of optical fibers require different waveguide film thicknesses and indices of refraction to minimize coupling losses into and out of the waveguide. The overall thickness of the waveguide is also important in device design because devices having thinner, higher index cores allow more complex devices, with tighter bends, to be fabricated in the same size package.

Optical telecommunications systems today are large and expensive, requiring racks of equipment to enable full realization of dense wavelength division multiplexing (DWDM) technology. To bring the benefits of optical voice and data transmission closer to the end user, as opposed to current long haul fiber-optic systems, the size and cost of the equipment must be reduced. Currently these systems are comprised of connected single-function components, with most of the cost and size being contributed by packaging and assembly. The coupling of these numerous individual devices also introduces unwanted complexity and signal loss into the overall system. Integration is the key to solving these issues, but methods for addressing this integration are lacking in the prior art. In particular, active waveguide materials often have a higher refractive index than the fiber or passive waveguides, and these materials are formed by different processes, further complicating integration. Thermooptic active devices may be formed from lower index waveguide materials similar to those used in the fiber core, but these devices typically operate at millisecond switching speeds or slower, whereas electrooptic devices, which operate at sub-nanosecond switching speeds and are therefore desirable for many high-speed applications, are generally very difficult to integrate onto wafers or chips containing passive devices. It is also difficult to achieve efficient coupling of current electrooptic devices with telecommunications-grade optical fibers, because of the differences in cross-sectional area between the fiber and the waveguide.

SUMMARY OF THE INVENTION

To achieve the above-described requirements, the present invention provides optical waveguides having continuously varying thicknesses and/or indices of refraction. While it may be desired to have a thicker (for example, on the order of up to 8 microns) waveguide at those portions coupled to an optical fiber (to maximize signal transfer), thinner intermediate portions with higher refractive index may be desired to allow the fabrication of more complex devices or to provide integration with active electrooptic materials on the same substrate. The higher index (as compared to the cladding) intermediate portions reduce the size of the guided optical mode(s), allowing sharper curves or transitions without attenuating the optical signal. The higher index portion of the waveguide is required because the relatively higher refractive index reduces leakage of the optical signal out of the waveguide, especially when the light is coupled into an active, electrooptic region on the same chip.

While the refractive index of the material of the waveguide may be varied as a function of the thickness of the waveguide, the refractive index of the material of the waveguide can also be varied independently of the thickness of the waveguide. This can be accomplished by varying doping levels or relative amounts of constituents that make up the waveguide. For example, when germanium-doped silica is used as the waveguide material the outer portions of the waveguide may have decreased levels of germanium, and therefore a lower relative refractive index. The total amount of silica and germanium may be constant across the waveguide, resulting in a relatively constant thickness. Alternatively, the index of the waveguide can be constant and that of the cladding varied, to achieve the net desired index change.

The refractive index and/or the thickness of the waveguide material and cladding may vary in three dimensions, including parallel to the longitudinal axis of the light entering the waveguide, perpendicular to this axis (across the width) and in the plane of the waveguide, or perpendicular to the plane (from top to bottom) of the waveguide. By varying the refractive index and/or the thickness in one or more of these three directions, different advantages can be achieved as explained in detail below.

Despite the many advantages that the waveguides of the present invention can offer in flexibility and design, in integration of multiple components to form highly integrated optical subsystems-on-a-chip, and in reduced optical losses within the waveguide structure and at their interfaces with external optical fibers, they have received little attention in the literature to date because of the difficulties inherent in fabricating these devices using conventional methods. However, combustion chemical vapor deposition (CCVD) with its inherent flexibility of flow rates, precursor concentration ratios, and motion control of the deposition apparatus, overcomes many of these difficulties. The waveguide material may be formed with a single CCVD nozzle (or flame) or may be deposited by a plurality or bank of flames. Details of these methods are explained below, and in the U.S. patents cited below.

In a typical process, according to the present invention, the waveguide material will be deposited on a substrate in which at least a surface portion of the substrate has a refractive index lower than all portions of the waveguide material to be deposited thereon. The waveguide material is deposited on the surface so that the edge portions of the deposited layer that will interface with input or output optical fibers (hereinafter referred to as the fiber-coupling regions of the waveguide), are thicker than at least a portion of the region between the fiber-coupling regions and/or so that at least a portion of the region between the fiber-coupling regions has a refractive index that is higher than the refractive index or indices of each of the fiber-coupling regions. Through photolithography techniques known in the art, the layer is patterned into waveguide devices which run from edge to edge. Then the waveguides are covered with a low refractive index cladding material as is known in the art, or the cladding can be varied as described above. More efficient coupling between systems can be achieved by providing a waveguide coupler that matches the thickness and relative index of different fibers.

BRIEF DESCRIPTION OF THE DRAWINGS

FIG. 3 is a cross-section of an optical waveguide material.

FIG. 4 is a top view of the waveguide shown in FIG. 3.

DETAILED DESCRIPTION OF THE PREFERRED EMBODIMENTS

The present invention may be understood more readily by reference to the following detailed description of preferred embodiments of the invention and the figures.

Figure 1:
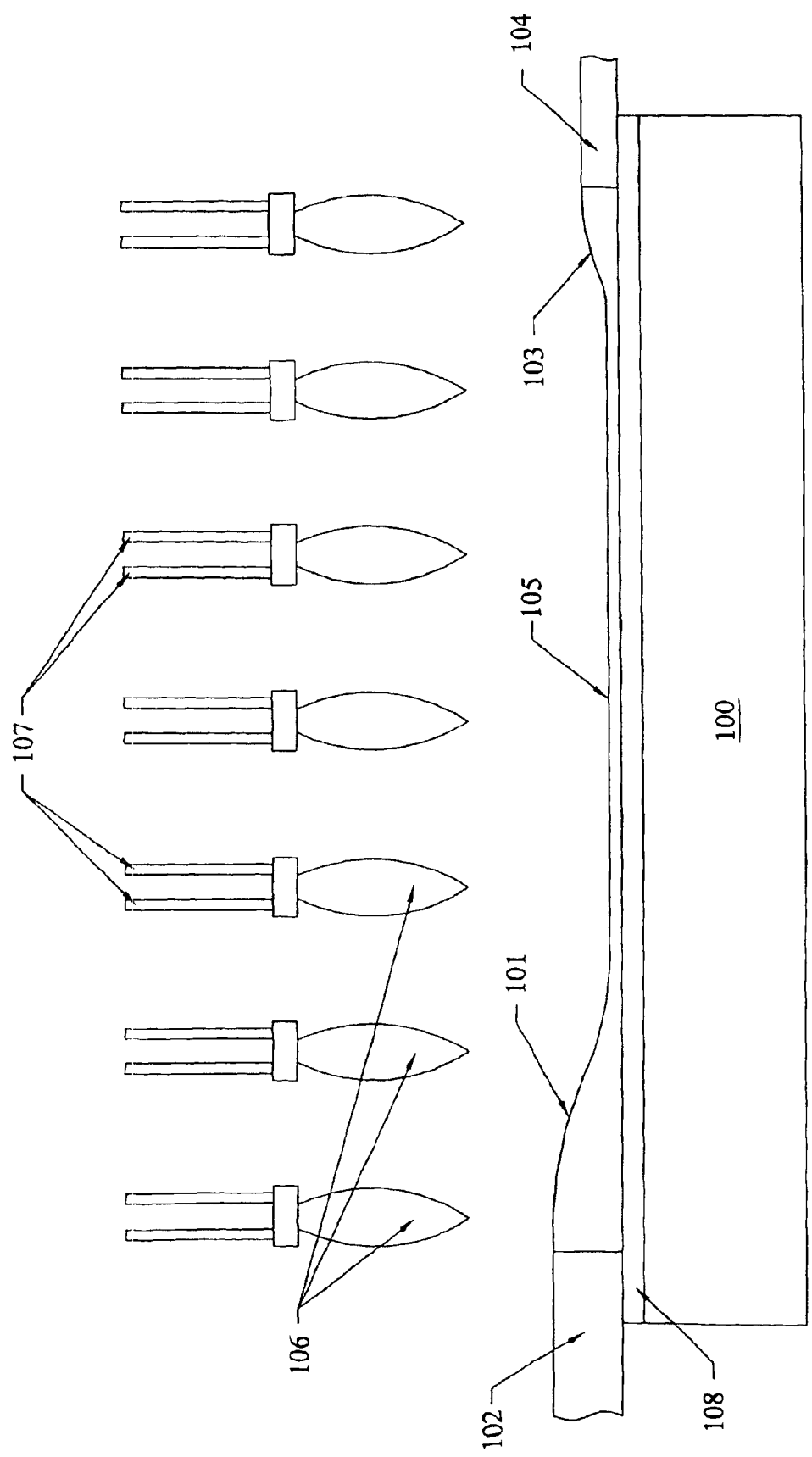
FIG. 1 is a cross-section of a first embodiment of optical waveguide material of the present invention, and an apparatus for making the waveguide material.

FIG. 1 illustrates a first embodiment of the optical waveguide of the present invention, and one particular device for making the waveguide. The waveguide is constructed on a substrate 100 made of silicon having an oxidized (silica) surface 108, on glass, on quartz or on other suitable material exhibiting very low attenuation of light at the wavelength of operation, and having a refractive index lower than that of the waveguide core layer, as described below. A first optical fiber core 102 is shown mounted to the left side of the substrate 100, and a second optical fiber core 104, which may or may not be the same size as the first optical fiber core 102, is shown mounted to the right side of the substrate 100. Waveguide material is deposited onto of the substrate 100 and patterned photolithographically as desired to provide an optical waveguide from optical fiber core 102 to optical fiber core 104. It is understood that in practice, a lower-index upper clad layer would be deposited on top of the patterned waveguide core layer, to isolate it optically; however, for clarity, the clad layer has been omitted from the drawings. As shown in FIG. 1, in the case where optical fiber core 104 is smaller than optical fiber core 102, the waveguide has a relatively thicker portion 101 adjacent to the connection with optical fiber core 102, a relatively thinner central portion 105, and an intermediate thickness portion 103 adjacent to the connection with optical fiber core 104. The portions 101 and 103 adjacent the optical fiber cores, 102 and 104, respectively, are designed to minimize coupling losses between the waveguide and the fiber cores. That is, the cross-sectional areas and refractive indices of the ends of the waveguide are designed to substantially reduce losses by optimizing their match to the cross-sectional areas and refractive indices of the optical fiber cores. The central portion 105 is deposited as a relatively thinner, higher-index portion to allow smaller wavefronts and the inherent advantages thereof as previously described. In addition to having portions of varying thickness, the waveguide material may be deposited (and in some cases must be) with regions of varying composition and indices of refraction. For example, the central, thinner portion 105 will often require a higher refractive index than the thicker portions of the waveguide to avoid loss into the adjacent substrate 100 and/or other layers (such as 108) having lower indices of refraction. Portion 105 may be the same thickness or thinner than the optical fiber cores, 102 and 104, to allow smaller devices.

One type of coating apparatus that can be used to deposit the waveguides of the present invention is shown as a plurality of combustion chemical vapor deposition (CCVD) flames 106. The flexibility of CCVD techniques is described, for example, in U.S. Pat. Nos. 5,652,021, 5,858,465, 5,863,604, 5,997,956 and 6,013,318, the teachings of each of which are incorporated herein by reference. One of the important advantages of CCVD involves the ability to feed multiple precursor solutions to a single flame via multiple supply lines 107. This advantages can be used to supply each flame of a bank of flames with its own chemistry to form discrete refractive indices for each discrete portion of an optical device. In addition, flow rates of the precursor solutions can be precisely controlled to provide specific deposition rates and/or stoichiometric ratios between multiple coating constituents. For example, the flow rates of precursor solutions being fed to the CCVD flames closest to the waveguide portion 101 may be of a higher value than the flow rates of precursor solutions being fed to the CCVD flames closest to the waveguide portion 103. The flow rates of precursor solutions being fed to the CCVD flames closest to the central waveguide portion 105, may be lower still, thus resulting in a waveguide having relative thicknesses as shown in FIG. 1. As a further example, the relative amounts of two or more different precursor solutions may be varied in the same manner to provide higher and lower indices of refraction at different locations along the waveguide in all three dimensions. Other examples, including specific materials, are described below. It should be understood that other methods may be used to produce the variable thickness, and variable refractive index waveguides of the present invention, and the waveguides described herein are not considered to be limited by their method of manufacture.

Figure 2:
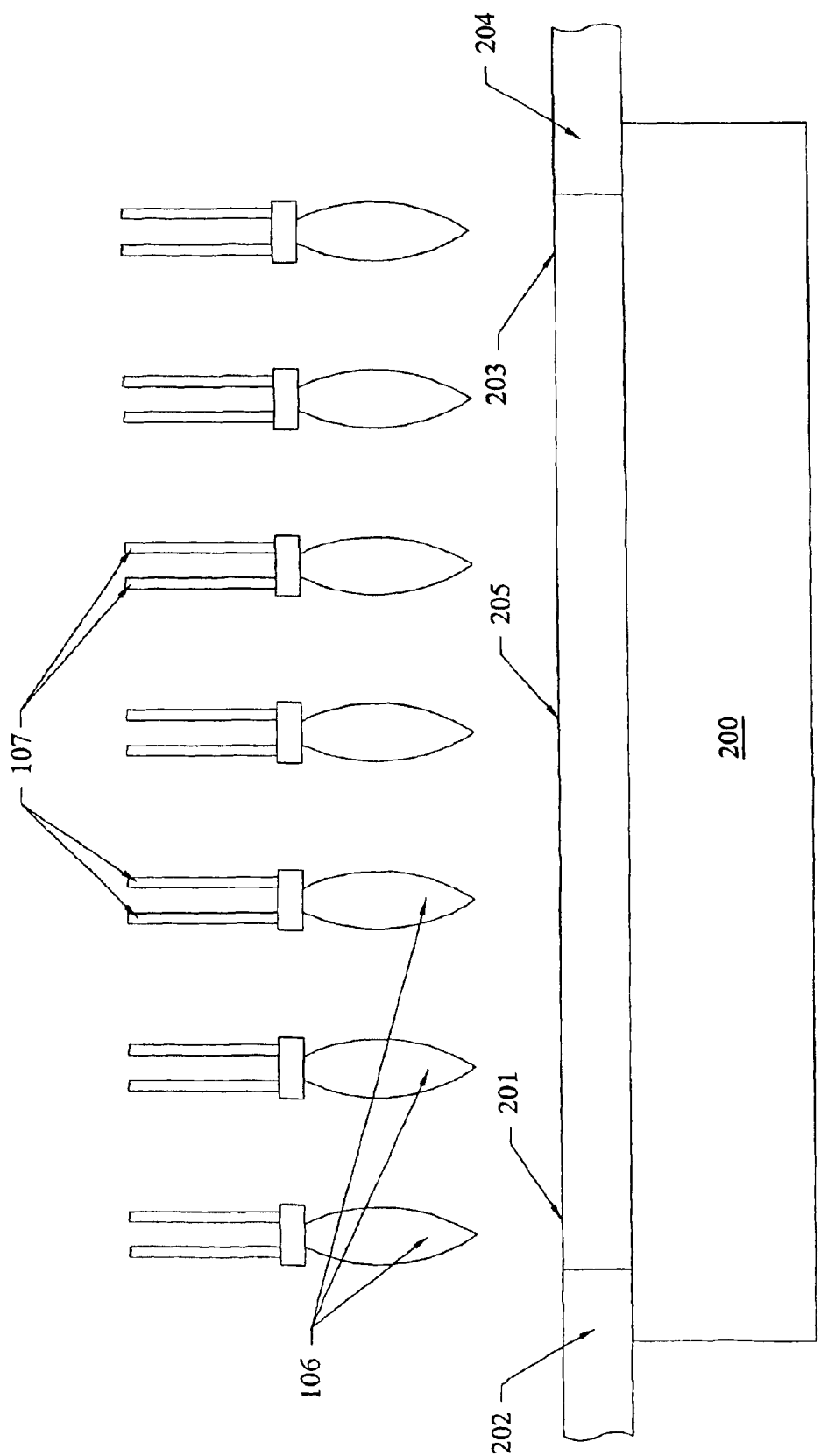
FIG. 2 is a cross-section of a second embodiment of optical waveguide material, and an apparatus for making the waveguide material.

In FIG. 2, another embodiment of the waveguide is shown. In this embodiment, a substrate 200 having the same properties described for the substrate in FIG. 1, and for which a thermal oxide layer or other lower-index cladding layer is understood to be included if needed, is coated with waveguide material at a relatively uniform thickness across the length of the waveguide. In this particular example, the optical fiber cores 202 and 204 are of approximately the same diameter, and therefore the thickness of the waveguide at portions 201 and 203 is also about the same. Should it be desired to vary the refractive index of the waveguide at various locations (such as 201, 203 and/or 205), the stoichiometric ratio of coating constituents can be varied in each of the CCVD flames 106 via conduits 107. When the thickness of the waveguide is preferably constant, flow rates of precursor solution to all of the flames maybe the same, but the precursor solutions to the outer flames may have lower concentrations of one or more constituents of the precursor chemicals, while the precursor solutions fed to the inner flames may have higher concentrations of these particular types of precursor. In this manner, the refractive index may be varied while maintaining a relatively constant thickness of waveguide material.

It should also be understood that while FIGS. 1 and 2 show a bank of CCVD flames 106, a single or multiple flames can be used in a scanning manner to produce the waveguides of the present invention. Flow rates of one or more of the coating precursors can be varied as the CCVD nozzles transverse the surface of the substrate, resulting in regions of higher dopant levels and therefore varying indices of refraction. Furthermore, flow rates from the CCVD nozzles can be held constant and scanning rates can be changed, resulting in thinner waveguide portions in those areas of the substrate where scanning takes place at a higher rate of speed. Obviously there are a myriad of methods of using CCVD and non-CCVD methods to produce the waveguides disclosed herein, CCVD being the preferred method due to its known flexibility in changing deposition rates and stoichiometric ratios.

Changes in the thickness and/or the refractive index may be gradual with a relatively small gradient, or may be much more abrupt, up to and including stepped changes in the thickness or refractive index. Stepped changes can be used to produce multi-layer waveguides by forming adjacent regions of high and low relative refractive index. Step changes can be made by etching as is known in the art, gradual changes can be formed by co-depositing different solutions in these regions, whereby increased coupling between adjacent layers of material can be realized as compared to prior art devices. By gradually changing the refractive index with a corresponding change in thickness, the mode structure of the guided light passing through the waveguide may be controlled in a systematic manner, while allowing a thinner central portion with the inherent advantages thereof. The present invention allows the index profile to be varied in ways that are difficult if not impossible to achieve with conventional manufacturing processes such as in-diffusion, axial metal-organic chemical vapor deposition, or flame hydrolysis deposition.

FIGS. 3 and 4 show a further embodiment of the waveguide of the present invention wherein a substrate 300 has a layer of electrooptic waveguide material 305 deposited thereon, for guiding light from optical fiber core 302 to optical fiber cores 304. The electrooptic waveguide material 305 is then selectively etched using photolithography or other known methods to form the splitter as shown in FIG. 4. The optical fiber cores 302 and 304 are connected to the waveguide by one or more known methods in the industry. A biasing electrode layer 308 includes two or more electrodes 400 and 402 for producing an electric field. A cladding layer 306 is used to keep the light in the electrooptic layer 305, and the electrode layer 308 is formed on top of layer 306. The electric field extends into the electrooptic waveguide material 305 to thereby change the refractive index of the waveguide. This change in index guides the light in the waveguide to one or both of the fiber cores 304. As with the embodiments of FIGS. 1 and 2, the thickness and/or the refractive index of the waveguide material 305 can vary along the length of the waveguide. Furthermore, it is also possible that by using electrooptic material, the amount of change in the refractive index can be locally adjusted by varying the stoichiometric ratio of the constituents of the electrooptic material 305 along the length of the waveguide. A number of new generation optical devices (i.e. tunable arrayed waveguide gratings or switches/splitters) beyond a controllable splitter as shown, could be produced using this construction. Fiber core 302 and fiber cores 304 are just representative and could include any number of fiber cores.

Layer 305 need not be electrooptic along its entire length, in order for the portion biased by electrodes 400 and 402 to be electrooptic. In the same manner the refractive index along the length of layer 305 can be adjusted by changing the composition of layer 305 along its length. By using the apparatus of FIGS. 1 and 2, different materials can be deposited at different points along the length of layer 35. For example, the portions adjacent the fiber cores 302 and 304 may be formed of doped silica, to thereby match the refractive indices of the fiber cores, increasing light transfer between the waveguide and the fiber cores. In the center of the waveguide, an electrooptic material, such as lithium niobate, can be used to provide the adjustability of the refractive index. The transition from one waveguide material can be accomplished in a gradient manner to allow maximum light transfer (minimum loss).

Figure 5:
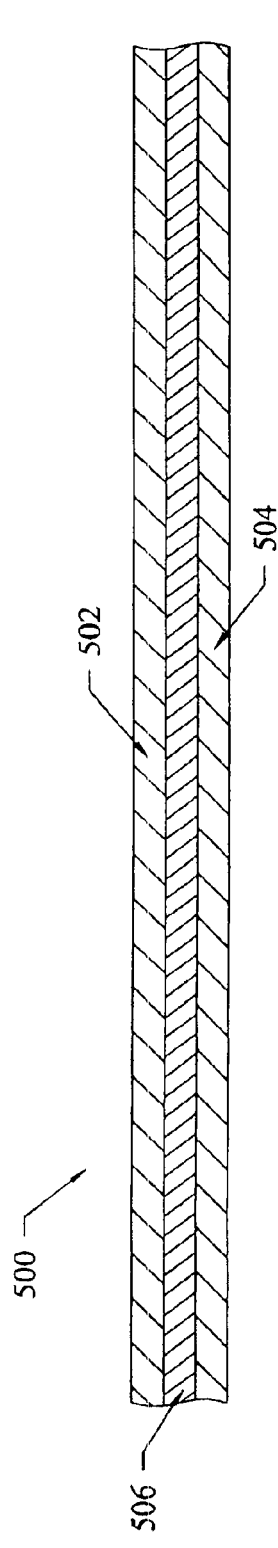
FIG. 5 is a side view of waveguide material showing different layers thereof.

FIG. 5 is a schematic side view of waveguide material 500 wherein a central portion (core) 506 is formed of material having a higher refractive index than the cladding material forming the top 502 and bottom 504 portions of the waveguide. By increasing the refractive index in the middle of the waveguide, the light is held in the center of the waveguide as it travels through the waveguide. This results in lower loss of the optical signal as it travels through the waveguide. Using CCVD, it is much easier to change concentration levels as the waveguide material is deposited, to form the regions of lower and higher indices of refraction.

The transitions between these regions do not have to be abrupt as shown in FIG. 5, but may gradually change from a region of low refractive index to regions of higher refractive index.

Figure 6:
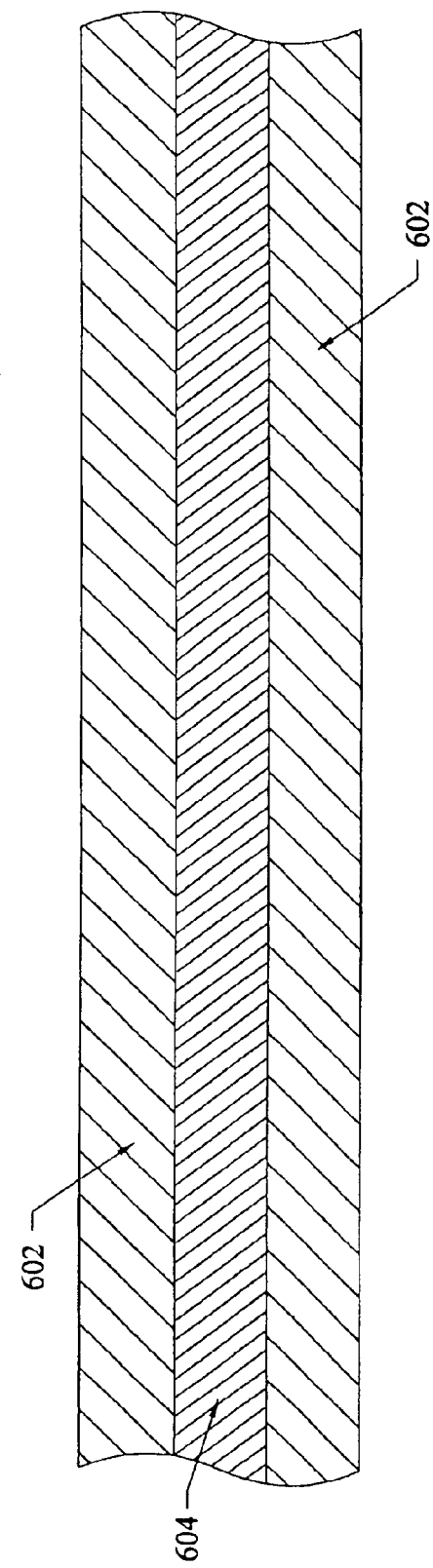
FIG. 6 is a top view of waveguide material.

FIG. 6 is a schematic top view of waveguide material 600 having regions 602 of low refractive index (cladding) and a region 604 of higher refractive index (core). Left to right in FIG. 6 is the longitudinal axis of the light as it travels through the waveguide constructed from the material shown in FIG. 6. Although only three different regions are shown it should be understood that a plurality of regions may be formed depending on the type of optical device being produced. As with vertical variations, the flexibility of CCVD allows easy transition from regions of relatively low and high indices of refraction. The transitions between these regions do not have to be abrupt as shown in FIG. 6, but may gradually change from a region of low refractive index to regions of higher refractive index. It should be understood that these regions may vary in any of three dimensions as the deposition process is performed, and that the variation may be gradual or stepwise in any of these directions independently of the particular direction. Layers 602 may be formed of transparent conducting oxide (TCO) material with relatively low refractive index, thereby forming a cladding layer as well as a biasing layer for changing the refractive index of the core 604 when it is formed of electrooptic material.

Figure 7:
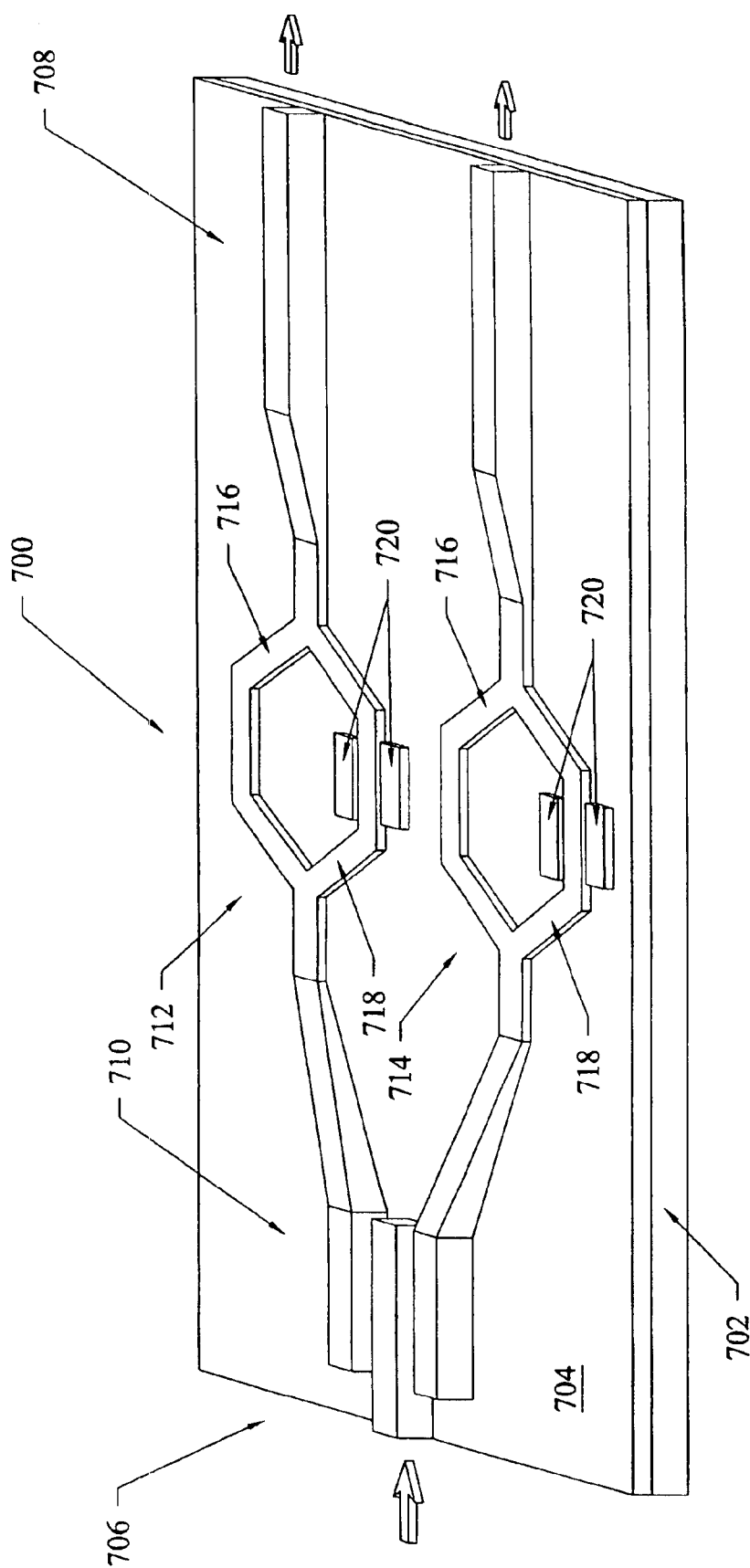
FIG. 7 is an isometric view of an integrated optical subsystem device formed using waveguide material of the present invention.

FIG. 7 shows a isometric view of a waveguide device 700 known in the art as a splitter and two Mach-Zehnder interferometers, that can be formed by first etching portions of the simple waveguide shown in FIG. 1. The device includes a substrate 702 with a top layer of low index material such as silica glass 704 having a waveguide formed thereon. The waveguide includes an input region 706 and an output region 708, that are formed on the thicker portions of waveguide material that is closely matched to the refractive index of the fiber cores (such as doped silica). At the input region 706 the waveguide includes a splitter 710 that guides part of the light into branch 712 and part of the light into branch 714. Between the splitter 710 and the output region 708, each branch splits into a first arm 716 and a second arm 718. The arms 716 and 718 are formed in the central region which is composed of thinner, higher-index electrooptic material (such as lithium niobate). When the light recombines as the two arms meet, the modes of different frequencies of light propagating through the two arms of the device will recombine either constructively or destructively. In this manner, each branch 712 and 714 acts as a fixed optical filter. Electrodes 720 can further be added on both sides of one of the arms (for example, 718 as shown). Alternatively, an electrode having a first polarity can be placed between the two arms and electrodes of opposite polarity can be placed on the outer side of both arms, thus forming two electric fields with three electrodes. By forming at the arms 718 and 716 from an electrooptic material, when an electric potential is applied between the electrodes, an electric field permeates the material of arm 718 thereby changing the refractive index in arm 718. As with the fixed optical filter not having the electrodes 720, the light from the two arms recombines with constructive and destructive inference, depending on the wavelength of the light. As the electric field can be varied, the refractive index is changed in arm 718, thereby switching between constructive and destructive recombination in one or more wavelengths of light. This effect can be used as adjustable optical filter, or as a modulation device by applying a changing potential (electrical signal) between the electrodes 720. It should be noted that arm 716 may or may not be formed of electrooptical material; however, obviously it is simpler to make all the arms of the same composition. It should also be understood that the number and individual length of the arms can vary. A single device or branch may include arms that are of different length so that differences in length as well as differences in refractive index have an impact on the constructive or destructive nature of the recombination of light. Thus in active devices, the recombination of a particular wavelength or wavelengths may be destructive without an applied electric field (due to the difference in optical path) and constructive when an electric field is applied.

Figure 8:
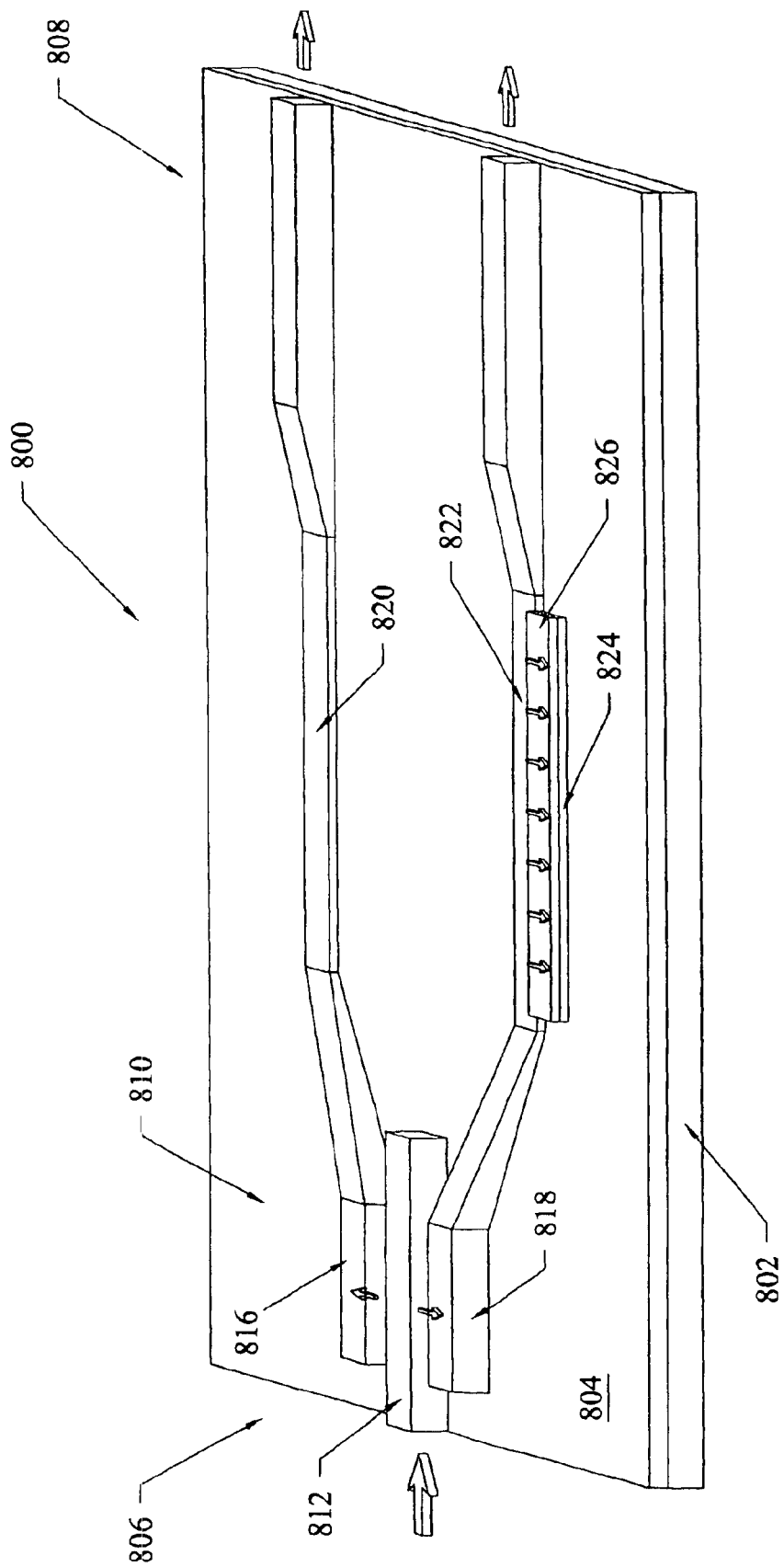
FIG. 8 is an isometric view of a second embodiment of an integrated optical subsystem device.
Figure 9:
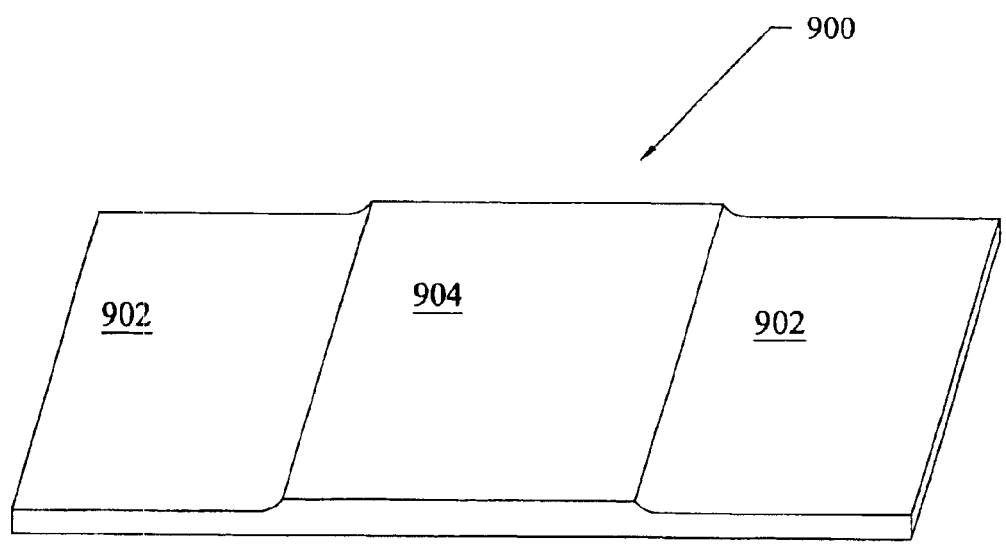
FIGS. 9–12 show the various steps in forming a third embodiment of an integrated optical subsystem device.
Figure 10:
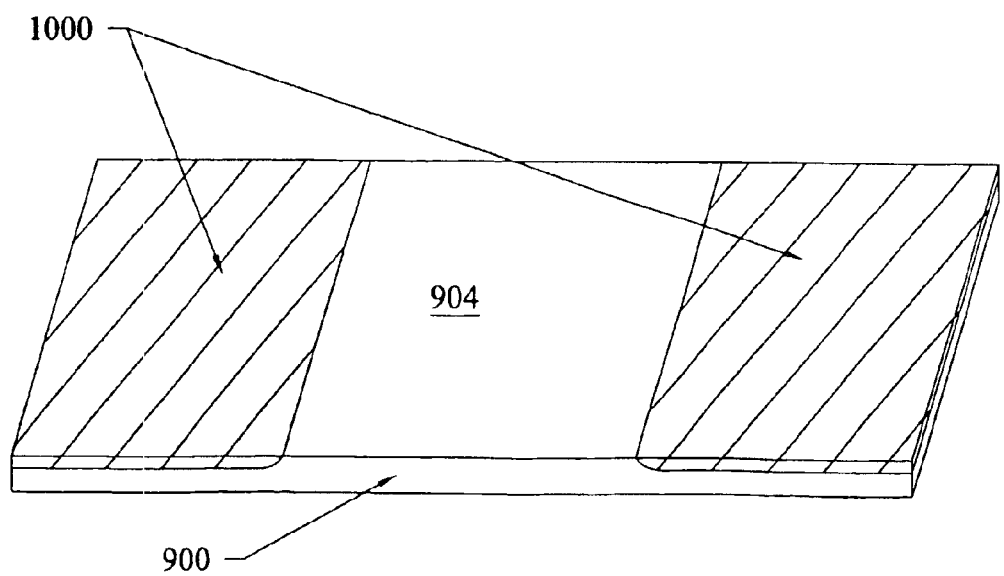

In FIG. 8 a different type of integrated optical subsystem 800 is illustrated that can also be formed by patterning the waveguide material of FIG. 1. The device includes a substrate 802 with a top layer of low index material such as silica glass 804 having a waveguide formed thereon. Alternatively, layer 804 may be a low index transparent conductive oxide (TCO) for reasons explained below. The waveguide includes an input region 806 and an output region 808. At the input region 806 the waveguide includes a splitter 810 that guides part of the light from branch 812 into branch 816 and part of the light into branch 818. Branches 816 and 818 separate and taper down to form arms 820 and 822, respectively. Adjacent and abutting arm 822 is another strip 824 of electrooptic material having an refractive index close to or slightly below the refractive index of the material in arm 822. An electrode 826 is deposited on top of strip 824 and a second electrode (not shown) is positioned below strip 824. Alternatively, layer 804 may be formed as a transparent conductive oxide having the proper refractive index for maintaining the light within the waveguide, while also serving as a second electrode. This electrode arrangement may also be used with the embodiment of FIG. 7. When a voltage is applied between the electrodes, the refractive index of strip 824 is changed, and depending on the orientation of the electric field as well as the orientation of the dipoles within of the electrooptic material, the refractive index can be made to increase slightly above the refractive index of arm 822. Some of the light in arm 822 is thereby routed into strip 824, thus acting as an attenuator. Light from both arms 820 and 822 exits the integrated optical subsystem 800 through output region 808. The attenuator can be used to balance light output from the two arms 820 and 822, or to provide different levels of light intensity.

Figure 11:
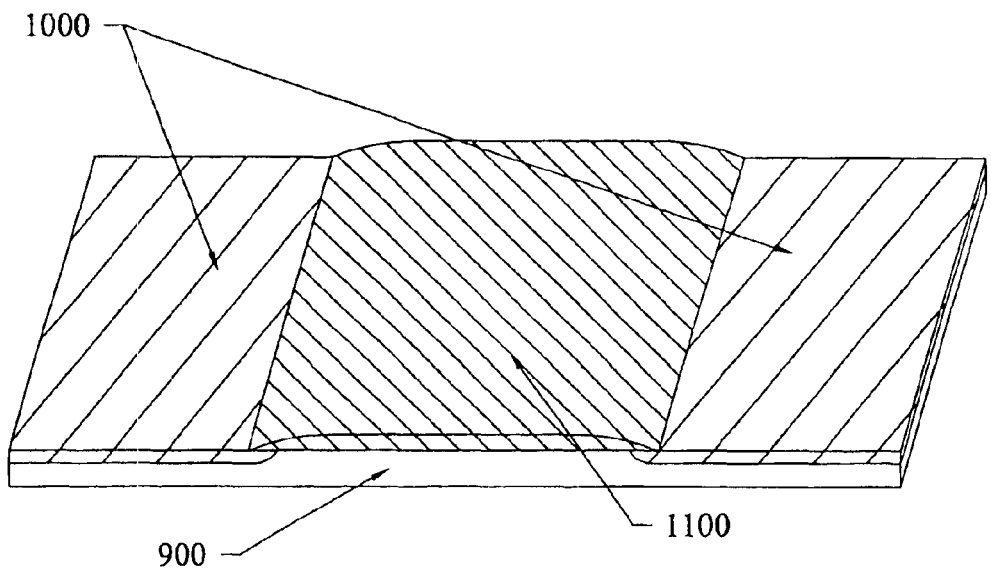
Figure 12:
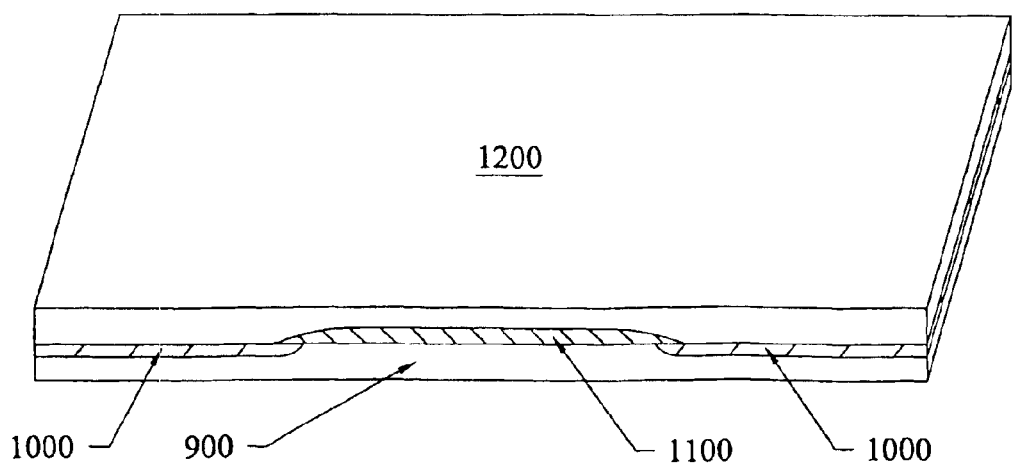
Figure 13:
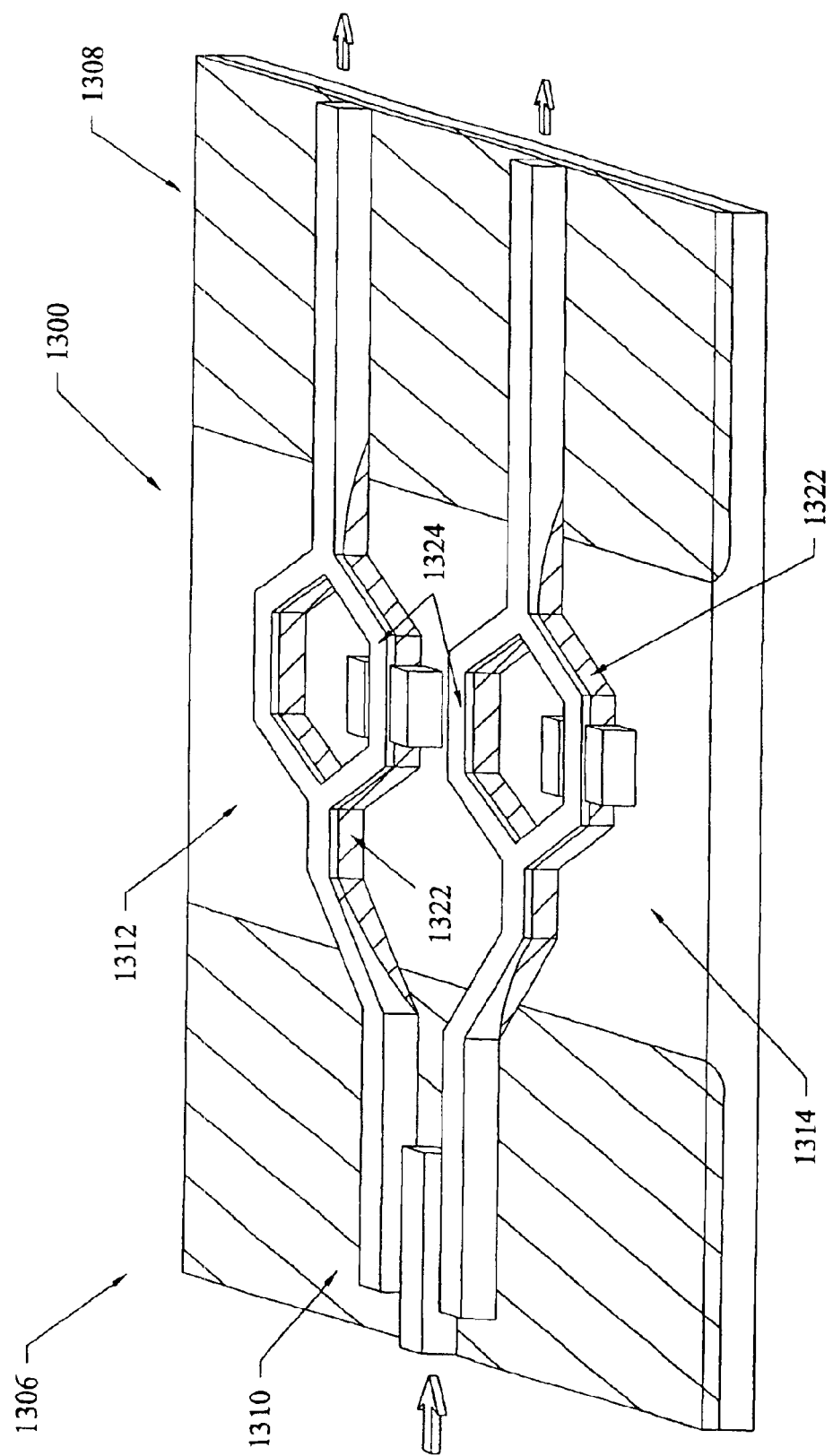
FIG. 13 is an isometric view of the third embodiment of an integrated optical subsystem device formed using the steps shown in FIGS. 9–12.

FIGS. 9–12 illustrate a method for forming another embodiment of the optical systems of the present invention. A substrate 900 is formed of a material (such as sapphire) that promotes epitaxial growth of electrooptic material. The substrate 900 includes a central raised portion 904 and lowered side portions 902. The lowered portions 902 may be formed by photolithographically etching part of the substrate away, for example. A second material 1000 is then deposited on the lowered portions 902 of the substrate 900 until the lowered portions are filled to approximately the level of the raised portion 904. Material 1000 has a refractive index that is lower than the substrate and is similar to that of cladding used in telecommunications-grade single-mode optical fibers. One such material is boron-doped silica, although others may be used as well. A layer of electrooptic material 1100 (such as lithium niobate or barium titanate) is then deposited on top of raised portion 904, with part of material 1100 overlapping on top of material 1000, as is best shown in FIG. 11. Another waveguide material 1200 having a thickness and refractive index similar to that of the core in a telecommunications-grade single-mode optical fiber (such as doped silica) is then deposited on top of both the material 1000 as well as the electrooptic material 1100, to form the composite material system shown in FIG. 12. To form the optical subsystem 1300 as shown in FIG. 13, the waveguide material 1200 and the electrooptic material 1100 of the composite material of FIG. 12 are selectively etched photolithographically. The optical subsystem 1300 is similar in operation to the subsystem 700 shown in FIG. 7. The waveguide includes an input region 1306 and an output region 1308, that are formed of waveguide material 1200 as shown in FIG. 12. At the input region 1306 the waveguide includes a splitter 1310 that guides part of the light into branch 1312 and part of the light into branch 1314. The waveguide branches 1312 and 1314 include a lower portion 1322 that is formed from the electrooptic material of 1100, and an upper portion 1324 formed from the waveguide material 1200. It should be noted that the relative thicknesses of lower portion 1322, and upper portion 1324 can be varied depending on the material used in each portion, although for a silica upper portion and a barium titanate lower portion, the upper portion 1324 would be much thicker than the lower portion 1322. The lower portion 1322 has been illustrated in FIGS. 13-16 as being thicker than upper portion 1324 to better illustrate the overall shape of the lower portion 1322. The basic operation of waveguide 1300 is the same as that of waveguide 700 as previously described with respect to FIG. 7.

Figure 14:
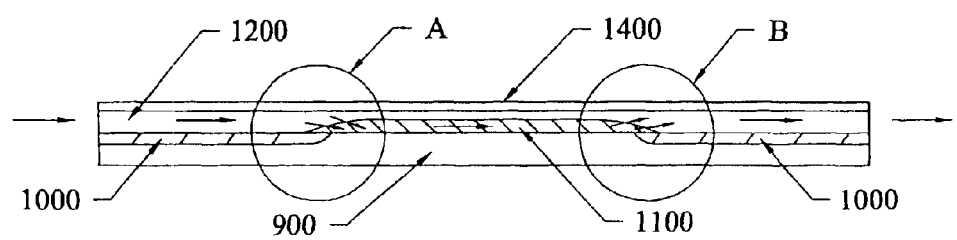
FIGS. 14–16 illustrate how light propagates through the integrated optical subsystem device of FIG. 13.
Figures 15, 16:
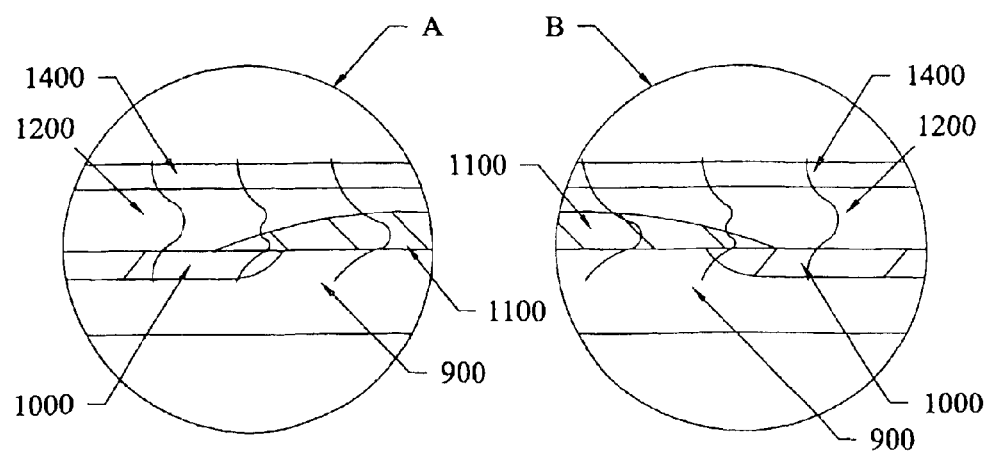

The hybrid material structure of the waveguide 1300 has the following effect on the light traveling therethrough, as described using FIGS. 14–16. FIG. 14 shows a cross section through the length of one of the branches 1312 or 1314 of optical subsystem and waveguide 1300. A top cladding layer 1400 has been added, as would be needed in all of the above-described waveguides. Light enters the branch traveling in material 1200 between layers 1400 and 1000, both of which are made of material having a lower refractive index than material 1200, thus they act as cladding for layer 1200. When the light reaches point A, it encounters the layer of electrooptic material 1100, having an even higher refractive index. As the layer 1200 decreases in thickness, more of the light is forced into the electrooptic material 1100, until all or substantially all of the light is traveling in the electrooptic material 1100 in the branches 1312 and 1314. The substrate 900 and the material 1200 both have indices of refraction that are lower than the refractive index of the electrooptic material 1100, thus they act as the cladding layers about material 1100. When the light reaches point B, the layer of electrooptic material 1100 tapers, and the light is forced into layer 1200, as it has the closest refractive index to layer 1100. The light then continues in layer 1200 with layers 1400 and 1000 both, once again functioning as cladding layers. With such a structure, it is possible to integrate passive optical materials with active optical materials on the same substrate and therefore in the same final package. This reduces the size of the optical subsystems, while reducing losses between discrete devices that must be optically connected together.

Figure 17:
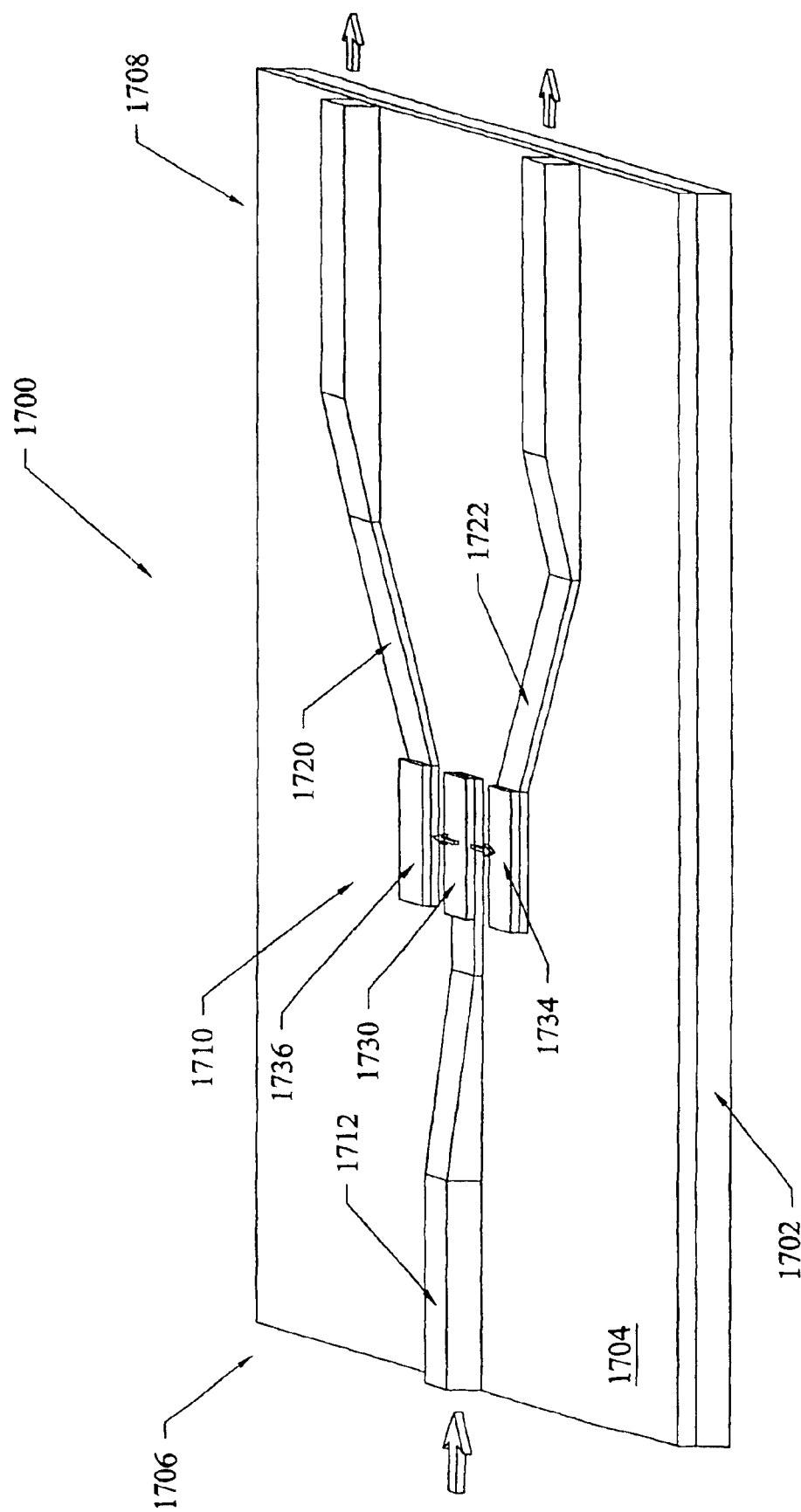
FIG. 17 is an isometric view of a fourth embodiment of an integrated optical subsystem device.

In FIG. 17 yet another type of integrated optical subsystem 1700 is illustrated that can also be formed by patterning the waveguide material of FIG. 1. It should also be noted that the waveguides of FIGS. 7, 8 and 17 can be built of composite waveguide materials as shown for the waveguide of FIG. 13. The integrated optical subsystem 1700 includes a substrate 1702 with a top layer of low index material such as silica glass 1704 having a waveguide formed thereon. Alternatively, layer 1704 may be a low index transparent conductive oxide (TCO) as explained above with respect to integrated optical subsystem 800 above. The waveguide includes an input region 1706 and an output region 1708. At the input region 1706 the waveguide core 1712 is relatively thick and has a relatively low index of refraction. Towards the central port ion of the integrated optical subsystem 1700, waveguide core 1712 tapers in thickness and has a progressively higher index of refraction and in the central portion is formed of electrooptic material. Waveguide core 1712 continues until it forms an adjustable splitter section 1710 with arms 1720 and 1722. Three electrodes 1730, 1734 and 1736 are deposited on top of core 1712 and arms 1722 and 1720, respectively. Layer 1704 is formed as a transparent conductive oxide having the proper refractive index for maintaining the light within the waveguide, while also serving as a second electrode for the three biasing electrodes 1730, 1734 and 1736. When a voltage is applied between the electrodes, the refractive index of core 1712 and the arms 1720 and 1722 are changed, and depending on the orientation of the electric field as well as the orientation of the dipoles within of the electrooptic material, the refractive index within the adjacent portions of core 1712 and arms 1720 and 1722, can be made to increase or decrease slightly. By applying a bias to electrode 1730 and decreasing the refractive index of core 1712 while simultaneously reverse biasing the electrodes 1734 and 1736, the change of the refractive index between core 1712 and arms 1720 and 1722 is doubled, thus increasing light transfer between these portions of integrated optical subsystem 1700. Some of the light in core 1712 is thereby routed into arms 1720 and 1722. By biasing the electrodes 1734 and 1736 with different bias voltages, the amount of light transferred into each arm can be independently controlled. Both arms 1720 and 1722 then increase in thickness, while decreasing in refractive index, such that they provide a better match to the fiber cores (not shown) they are connected to in output region 1708. An advantage over the splitter configuration shown in FIG. 8, is the ability to control light level in both output branches without lowering the overall light output from both arms 1720 and 1722 (an important consideration in optical devices).

Glasses of various chemical compositions may be deposited by CCVD that are suitable for forming the waveguide. A currently contemplated CCVD depositable glass is a doped borosilicate glass. Borosilicate glasses doped with a variety of dopants may have refractive indices between 1.46 and 1.68 depending upon the dopant and the level of dopant. Phosphorous, germanium, aluminum, and lead are four of the currently preferred dopants for varying the indices of refraction in the deposited glass. Thus, a linear array of CCVD flames, such as are described in respect to FIGS. 1–2, can each burn a precursor solution containing boron and silicon precursors in similar molar ratios, plus a germanium, aluminum, and/or lead precursor, each precursor solution containing a different level of germanium, aluminum, and/or lead precursor, or the dopant precursor in each flame may be a different chemical, e.g., a precursor for lead and a precursor for germanium. By using the array of flames, each flame deposits material of different refractive index, the regions between the flames being a blend of material from each flame, whereby the refractive index is a gradient from one deposition region to the next.

Other elements which may be used to dope borosilicate glass include, but are not limited to Li, Na, K, Sr, Ba, Ca, Mg, Pb, Sr, La, Zn, Al, P and combinations thereof. Some specific combinations are Li and Al, Na and Ca, Na and Mg, Al and P, Ca and Mg, and Mg and Al.

Other materials which may be deposited by CCVD and used for waveguides in accordance with the present invention include silica doped with elements such as germanium and titanium.

Other waveguide materials include conductive oxides, such as tin oxide, zinc oxide, and indium tin oxide. These conductive oxides may also be used to form biasing electrodes on waveguide materials.

Suitable waveguide core materials also include high refractive index electooptic and non-electrooptic materials, such as an alkali metal niobate e.g., potassium and/or lithium niobate, $KTaO_3$, PZT (Pb/Zr/Ti oxide), PLZT (Pb/La/Zr/Ti oxide), barium titanate (BT), ZNO, high and low level doped silica (dopants such as germanium, phosphorous, alumina, boron, sodium, potassium and others as known in glass making), polymers, polyimide, polysiloxane, and others. Low refractive index materials can include magnesium fluoride and calcium fluoride Deposition of these materials by CCVD methods is described, for example in U.S. Pat. No. 5,997,956, the teachings of which are incorporated herein by reference. These materials can either be doped appropriately to vary the refractive indices, or the relative molar ratio of the metals, e.g., Ba:Sr or Pb in barium titanate, may be varied to provide a gradient of refractive indices.

Another factor to be considered is thermal expansion stress between the substrate and the waveguide. This can be minimized by having the deposited waveguide's thermal expansion more closely matched with the substrate's thermal expansion. Two of the more preferred substrate materials are silicon and sapphire, as noted previously. However, both of these substrate materials have coefficients of thermal expansion (CTE) much greater than that of the doped silica or doped borosilicate waveguide materials. The CTE of pure fused silica is $0.56 \times 10^{-6}$/degree K, whereas that of silicon is $3.8 \times 10^{-6}$/degree K, and that of sapphire is $8.0 \times 10^{-6}$/degree K. By doping the glass appropriately, the thermal mismatch can be minimized, while still controlling the refractive index. Adding elements such as Ca, Na, Mg, and others increases the CTE while only slightly affecting the refractive index. Alternatively, doping with Al increases the refractive index, while having essentially no effect on the CTE. These effects have been extensively studied in other areas of use and can be readily determined. Previously, these characteristics have not been applied in the construction of optical waveguides, because of process limitations. The structures and material combinations as enabled by the present invention allow for thermal and optical properties to be tailored so that variable refractive index waveguides with minimal thermal stresses can be formed. This minimizes or eliminates the need for thermal control of waveguides to maintain their performance, and also minimizes or eliminates the warping, optical distortion, or breakage that can result from these stresses, particularly when large area wafers are being coated.

A general list of CCVD precursor materials include, but are not limited to:

| | |
|---|---|
| Ag | silver nitrate, silver trifluoroacetate, silver acetate, silver cyclohexanebutyrate, silver 2-ethylhexanoate |
| Al | aluminum nitrate nonahydrate, aluminum acetylacetonate, triethylaluminum, aluminum sec-butoxide, aluminum iso-propoxide, aluminum bis(2-ethylhexanoate)monohydroxide |
| Au | chlorotriethylphosphine gold (I), chlorotriphenylphosphine gold (I) |
| B | trimethylborate, trimethoxyboroxine |
| Ba | barium 2-ethylhexanoate, barium nitrate, barium acetylacetonate hydrate, bis(2,2,6,6-tetramethyl-3,5-heptanedionato)barium hydrate |
| Bi | bismuth (III) nitrate pentahydrate, bismuth (III) 2-ethylhexonate |
| Cd | cadmium nitrate tetrahydrate, cadmium 2-ethylhexanoate |
| Ce | cerium (III) 2-ethylhexanoate |
| Cr | chromium (III) nitrate nonahydrate, chromium (III) 2-ethylhexanoate, chromium (III) sulfate hydrate, chromium hexacarbonyl, chromium (III) acetylacetonate |
| Cu | copper (II) 2-ethylhexanoate, copper (II) nitrate trihydrate, copper (II) acetylacetonate hydrate |
| Co | cobalt naphthenate, dicobalt octacarbonyl, cobalt (II) nitrate hexahydrate |
| Fe | iron (III) nitrate nonahydrate, iron (III) acetylacetonate |
| Ge | germanium acetylacetonate, germanium 2-ethylhexanoate |
| In | indium (III) nitrate hydrate, indium (III) acetylacetonate |
| Ir | dihydrogen hexachloroiridate (IV) hydrate, iridium (III) acetylacetonate, dodecacarbonyltetrairidium |
| K | potassium ethoxide, potassium tert-butoxide, 2,2,6,6-tetramethylheptane-3,5-dionato potassium |
| La | lanthanum (III) 2-ethylhexanoate, lanthanum (III) nitrate hexahydrate, lanthanum (III) acetylacetonate hydrate, lanthanum (III) iso-propoxide, tris(2,2,6,6-tetramethyl-3,5-heptanedionato)lanthanum (III) |
| Li | 2,2,6,6-tetramethylheptane-3,5-dionato lithium, lithium ethoxide lithium tert-butoxide, lithium 2-ethylhexoanate. |
| Mg | magnesium naphthenate, magnesium 2-ethylhexanoate, bis(2,2,6,6-tetramethyl-3,5-heptanedionato)magnesium dihydrate, magnesium acetylacetonate, magnesium nitrate hexahydrate |
| Mo | ammonium molybdate tetrahydrate, molybdenum hexacarbonyl, molybdenum (IV) dioxide bis(acetylacetonate) |
| Na | 2,2,6,6-tetramethylheptane-3,5-dionato sodium, sodium ethoxide, sodium tert-butoxide |
| Nb | niobium (V) ethoxide, tetrakis(2,2,6,6-tetramethyl-3,5-heptanedionato) niobium (IV), niobium (IV) (2-ethylhexanoate) |
| Ni | nickel (II) nitrate hexahydrate, nickel (II) acetylacetonate, nickel (II) 2-ethylhexanoate, nickel (U) napthenate, nickel carbonyl |
| P | triethylphosphate, triethylphosphite, triphenylphosphite |
| Pb | lead (II) 2-ethylhexanoate, lead naphthenate, bis(2,2,6,6-tetramethyl-3,5-heptanedionato)lead (II), lead (II) nitrate |
| Pd | diamminepalladium (II) nitrite, palladium (II) acetylacetonate, ammonium hexochloropalladate (IV) |
| Pt | platinum (II) acetylacetonate, platinum (II) hexafluoroacetylacetonate, diphenyl(1,5-cyclooctadiene)platinum (II), diammineplatinum (II) nitrite, tetraammineplatinum (II) nitrate |
| Ru | ruthenium (III) acetylacetonate |

-continued

| | |
|---|---|
| Si | tetraethoxysilane, tetramethylsilane, disilicic acid, metasilicic acid |
| Sn | tin (II) chloride dihydrate, tin (II) 2-ethylhexanoate, di-n-butyltin dilaurate, tetramethyltin, tetra-n-butyltin |
| Sr | strontium nitrate, strontium 2-ethylhexanoate, bis(2,2,6,6-tetramethyl-3,5-heptanedionato)strontium hydrate |
| Ti | titanium (IV) iso-propoxide, titanium (IV) acetylacetonate, titanium (di-iso-propoxide)bis(acetylacetonate), titanium (IV) n-butoxide, titanium (IV) 2-ethylhexoxide, titanium (IV) oxide bis(acetylacetonate) |
| W | tungsten hexacarbonyl, tungsten (VI) fluoride, tungstic acid |
| Y | yttrium (III) 2-ethylhexanoate, yttrium (III) nitrate hexahydrate, yttrium (III) iso-propoxide, yttrium (III) napthoate |
| Yb | ytterbium (III) nitrate pentahydrate |
| Zn | zinc 2-ethylhexanoate, zinc nitrate hexahydrate, zinc acetate |
| Zr | zirconium (IV) 2-ethylhexanoate, zirconium (IV) n-butoxide, zirconium (IV) hexafluoroacetylacetonate, zirconium (IV) acetylacetonate, zirconium (IV) n-propoxide, zirconium dinitrate oxide |

Various combinations of these precursors in appropriate solvents, such as toluene, isopropanol, methanol, ethanol, propane, toluene/propane mixture, etc. can be used to deposit the waveguide materials along with appropriate dopants. Typically, the precursor solutions contain total precursor levels of between about 0.01 and about 5 wt %. Numerous cations may be combined directly or in the CCVD flame. To enable amplification of the signal in the waveguide, materials such as rare-earths (ER) and other elements can be added to the core layer. If photons of the correct wavelength are entrained in the cladding then the optical signal in the core can be amplified. In such a manner, the total optical loss of the integrated device is further reduced or eliminated and a net gain may even be possible, provided that the proper optical pumping mechanism is supplied.

In the following examples, it is important to note that the final composition usually varies from initial elemental ratios. The variation, with some temperature, substrate, and other deposition conditions remaining fixed, can be controlled by varying the amount of each element fed to the flame. As the amount of each element's precursor is decreased or increased, there is, in most cases, some resultant increase or decrease in the amount of the element in the coating.

EXAMPLE 1

A master solution is prepared containing 0.001 molar trimethyl borate and 0.001 molar tetraethoxysilane (TEOS) in toluene. To this master solution is added, respectively, lead naphthenate at 0.0015, 0.0028, 0.0044, and 0.0064 molar levels. The array of seven flames shown in respect to FIGS. 1 and 2 are supplied these four solutions, the flames at the ends being supplied with the solution most dilute in lead, the flames progressively inward being supplied with solutions progressively more concentrated in lead. On both silicon and quartz wafers, eight micron thick layers are deposited by the CCVD flames providing a waveguide that is progressively higher in refractive index inward from the ends of the waveguide.

EXAMPLE 2

Four solutions of barium 2-ethylhexanoate, lead 2-ethylhexanoate and titanium (IV) 2-acetylacetonate at a combined level of 0.00 molar in toluene are produced. The Ba:Pb levels are respectively 1:0, 4:1, 2:1, and 1:1. With reference to the seven flame array illustrated in FIGS. 1 and 2, these solutions are used to produce the seven flames, the solution highest in Ba being burned in the outer flame, and the solutions progressively increasing in Pb concentration being burned in the flames progressively more inward. On a silicon wafer having a thermally-grown silica top layer, a 2 micron thick layer is deposited by the CCVD flames providing a waveguide that is progressively higher in refractive index inward from the ends of the waveguide.

EXAMPLE 3

A master solution is prepared containing 0.007 molar trimethyl borate and 0.001 molar tetraethoxysilane (TEOS) in toluene. The master solution is diluted 0.2:1, 0.5:1, and 1:1 with additional toluene to progressively more dilute solutions. Using the 7-flame array shown in respect to FIGS. 1 and 2, the flames at the outside is supplied with the master solution, and the flames progressively inward are supplied with progressively more dilute solutions. On both a quartz wafer and a silicon wafer having a thermally-grown silica top layer, waveguides are produced that are each 8 microns thick at the ends and 3 microns thick at the center.

EXAMPLE 4

The four lead-containing borosilicate precursor solutions of Example 1 are diluted respectively, from least concentrated in lead to most concentrated in lead with additional toluene at 0:2:1, 0.5:1 and 1:1 ratios. The four solutions are burned in flames with the lowest relative lead content, highest total concentration in the outer flames, and progressively relatively higher lead content, lower concentration solutions progressively inward. On a quartz wafer, a waveguide is produced that is 8 microns thick at the ends and 3 microns thick at the center. Thus this waveguide has the dual advantages of having a central region which is thinner and of higher refractive index than the ends of the waveguide.

What is claimed is:

1. An optical waveguide for transmitting light on a continuous optical pathway between a first optical fiber connection site and a second optical fiber connection site, said waveguide comprising a light-transmitting core that is formed of material of relatively high refractive index or indices and a material surrounding said core that is formed of material of relatively low refractive index or indices, said waveguide core having a first cross-sectional area at said first optical connection site, a second cross-sectional area at said second optical connection site that is the same or different than said first cross-sectional area, and at least one third cross-sectional area between said first and second optical connection sites substantially less than either said first or said second cross-sectional areas, and said material that forms said waveguide core having a first composition at one of either said first site or said second site and having a second composition at said at least one third cross-sectional area, wherein said first composition is different than said second composition.

2. The optical waveguide according to claim 1 wherein said core has a first refractive index at said first site, a second refractive index at said second site that is the same or different than the first refractive index, and a third refractive index at said at least one third cross-sectional area.

3. The waveguide according to claim 2 wherein said core is formed of doped silica at said first and said third site and is formed of ferroelectric material at said second site.

4. The waveguide according to claim 2 wherein said ferroelectric material is barium titanate.

5. The waveguide according to claim 4 further comprising means for electrically biasing said ferroelectric core material.

6. The waveguide according to claim 1 wherein said core is formed of doped silica.

7. The waveguide according to claim 1 wherein said core is formed of ferroelectric material.

8. The waveguide according to claim 7 further comprising means for electrically biasing said ferroelectric core material.

9. The waveguide according to claim 1 wherein said core has a generally continuous gradient of composition and refractive indices between said first site and said at least one third cross sectional area and between said at least one third cross sectional area and said second site.

10. An optical waveguide for transmitting light on a continuous optical pathway between a first optical connection site and a second optical connection site, said waveguide comprising a light-transmitting core that is formed of material of relatively high refractive index or indices and a material surrounding said core that is formed of material of relatively low refractive index or indices, said waveguide core having a first refractive index at said first site, a second refractive index at said second site that is the same or different than the first refractive index, and at least one third refractive index at a location between said first and second sites that is higher than each of said first and said second refractive indices, and said material that forms said waveguide core having a first composition at one of either said first site or said second site and having a second composition at said location between said first and second sites, wherein said first composition is different than said second composition.

11. The waveguide according to claim 10 wherein said core is formed in part of ferroelectric material.

12. The waveguide according to claim 10 further comprising means for electrically biasing said ferroelectric core material.

13. The waveguide according to claim 10 wherein said core is formed at least in part of doped silica.

14. The waveguide according to claim 10 wherein said core has a generally continuous gradient of composition and refractive indices between said first site and said location between said first and second site and between said location between said first and second site and said second site.

15. A layer of light-transmitting waveguide material on a substrate having a first edge portion and an opposed second edge portion, said first edge portion having a first composition and thickness and said second edge portion having a second composition and thickness which are the same or different than said first thickness, and at least one third portion between said first and second edge portions that is of a third composition and thickness, said third thickness being less than either said first or second thicknesses, and said third composition being different than one of either said first composition or said second composition.

16. The layer of claim 15 wherein said first edge portion has a first refractive index, said second edge portion has a second refractive index that is the same as or different than said first refractive index, and said third portion having a third refractive index that is higher than each of said first and said second refractive indices.

17. The layer of claim 15 having a generally continuous gradient of composition and refractive indices between said first edge portion and said third portion and between said third portion and said second edge portion.

18. The layer of claim 15 formed of ferroelectric material at said at least one third portion and formed of doped silica at said first and said second edge portions.

19. The layer of claim 18, wherein said ferroelectric material is barium titanate.

20. A layer of light-transmitting waveguide material on a substrate having a first edge portion and an opposed edge portion, said first edge portion having a first composition and refractive index, said second edge portion having a second composition and refractive index that are the same or different from said first edge portion and at least one third portion between said first and second edge portions having a third composition and refractive index, said third refractive index being higher than each of said first and said second edge portions, and said third composition being different than one of either said first composition or said second composition.

21. The layer of claim 20 having a generally continuous gradient of composition and refractive indices between said first edge portion and said third portion and between said third portion and said second edge portion.

22. The layer of claim 20 wherein said waveguide material is ferroelectric.

23. A method of forming a composite waveguide material comprising the steps of:

a) providing a substrate of a first material, said substrate having a raised central portion and two lowered side portions on either side of said raised central portion and said first material having a first refractive index;

b) depositing a layer of a second material on said lowered side portions, said second material having a second refractive index, said second refractive index being lower than said first refractive index;

c) depositing a layer of a third material on said raised central portion, said third material having a third refractive index, said third refractive index being higher than said first and second refractive indices;

d) depositing a layer of a fourth material on top of the second and third materials, said fourth material having a fourth refractive index, said forth refractive index being lower than said third refractive index and higher than said second refractive index; and e) depositing a layer of a fifth material on top of said fourth material, said fifth material having a fifth refractive index, said fifth refractive index being lower than said fourth refractive index.

24. A method of forming a waveguide comprising the steps of:
- a) providing a substrate of a first material, said substrate having a raised central portion and two lowered side portions on either side of said raised central portion and said first material having a first refractive index;
- b) depositing a layer of a second material on said lowered side portions, said second material having a second refractive index, said second refractive index being lower than said first refractive index;
- c) depositing a layer of a third material on said raised central portion, said third material having a third refractive index, said third refractive index being higher than said first and second refractive indices;
- d) depositing a layer of a fourth material on top of the second and third materials, said fourth material having a fourth refractive index, said forth refractive index being lower than said third refractive index and higher than said second refractive index;
- e) photolithographically etching said third and fourth materials to form a waveguide core; and
- f) depositing a layer of a fifth material on top of said waveguide core and exposed portions of said first and second materials, said fifth material forming a cladding layer and having a fifth refractive index, said fifth refractive index being lower than said fourth refractive index.

25. A composite waveguide material comprising:
- a) a substrate of a first material, said substrate having a raised central portion and two lowered side portions on either side of said raised central portion and said first material having a first refractive index;
- b) a layer of a second material on said lowered side portions, said second material having a second refractive index, said second refractive index being lower than said first refractive index;
- c) a layer of a third material on said raised central portion, said third material having a third refractive index, said third refractive index being higher than said first and second refractive indices;
- d) a layer of a fourth material on top of the second and third materials, said fourth material having a fourth refractive index, said forth refractive index being lower than said third refractive index and higher than said second refractive index; and
- e) a layer of a fifth material on top of said fourth material, said fifth material having a fifth refractive index, said fifth refractive index being lower than said fourth refractive index.

26. The composite waveguide material of claim 25, wherein said third material is a an electrooptic material.

27. The composite waveguide material of claim 26, wherein said fourth material is non-electrooptic.

28. The composite waveguide material of claim 27, wherein said third material is chosen from the group of barium titanate, lithium niobate, potassium niobate, $KTaO_3$, PZT, PLZT, and high and/or low level doped silica.

29. The composite waveguide material of claim 28, wherein said fourth material is chosen from the group of barium titanate, lithium niobate, potassium niobate, $KTaO_3$, PZT, PLZT, and high and/or low level doped silica.

30. The composite waveguide material of claim 29, wherein said third material is barium titanate, and said fourth material is doped silica.

31. A waveguide comprising:
- a) a substrate of a first material, said substrate having a raised central portion and two lowered side portions on either side of said raised central portion and said first material having a first refractive index;
- b) a layer of a second material on said lowered side portions, said second material having a second refractive index, said second refractive index being lower than said first refractive index;
- c) a waveguide core, said waveguide core having a lower layer of a third material and an upper layer of a fourth material, said third material having a third refractive index, said third refractive index being higher than said first and second refractive indices, said fourth material having a fourth refractive index, said forth refractive index being lower than said third refractive index and higher than said second refractive index; and
- d) a layer of a fifth material on top of said waveguide core and exposed portions of said first and second materials, said fifth material forming a cladding layer and having a fifth refractive index, said fifth refractive index being lower than said fourth refractive index.

32. The waveguide of claim 31, wherein said third material is a an electrooptic material.

33. The waveguide of claim 32, wherein said fourth material is non-electrooptic.

34. The waveguide of claim 33, wherein said third material is chosen from the group of barium titanate, lithium niobate, potassium niobate, $KTaO_3$, PZT, PLZT, and high and/or low level doped silica.

35. The waveguide of claim 34, wherein said fourth material is chosen from the group of barium titanate, lithium niobate, potassium niobate, $KTaO_3$, PZT, PLZT, and high and/or low level doped silica.

36. The waveguide of claim 35, wherein said third material is barium titanate, and said fourth material is doped silica.

* * * * *